No. 672,180. Patented Apr. 16, 1901.
R. W. READ.
HOSE COUPLING.
(Application filed July 10, 1900.)
(No Model.)
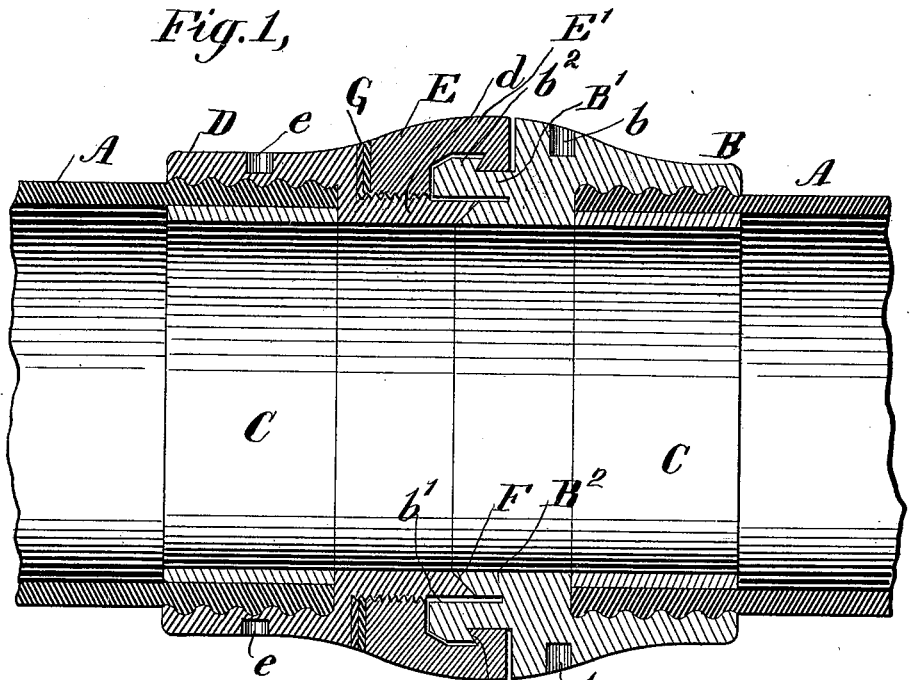
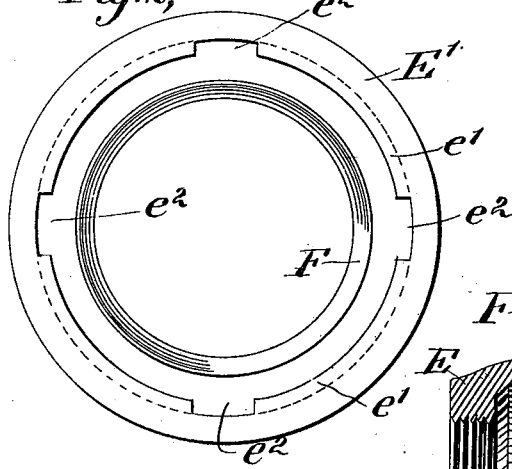
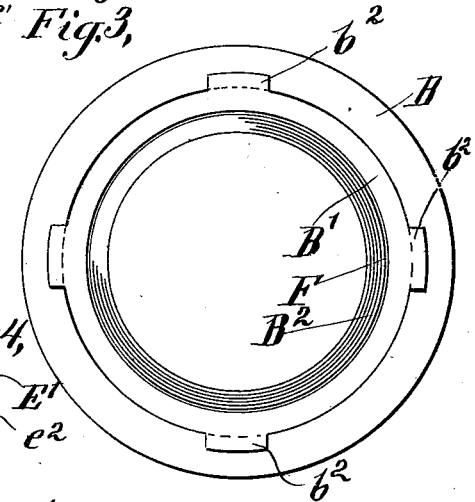
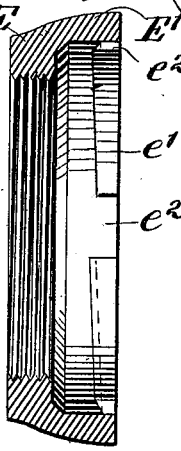
WITNESSES:
John O. Gempler.
Edwin Seges.
INVENTOR
Robert W. Read,
BY
Kenyon & Kenyon
ATTORNEYS.
THE NORRIS PETERS CO., PHOTO-LITHO., WASHINGTON, D. C.

UNITED STATES PATENT OFFICE.

ROBERT W. READ, OF BROOKLYN, NEW YORK.

HOSE-COUPLING.

SPECIFICATION forming part of Letters Patent No. 672,180, dated April 16, 1901.

Application filed July 10, 1900. Serial No. 23,080. (No model.)

*To all whom it may concern:*

Be it known that I, ROBERT W. READ, a citizen of the United States, and a resident of Brooklyn, in the county of Kings and State of New York, have invented a new and Improved Hose-Coupling, of which the following is a specification.

My invention relates to an improvement in hose-couplings, and comprises the novel features and combinations of parts hereinafter described and claimed.

My invention is fully illustrated in the accompanying drawings, forming a part of this specification, in which similar characters of reference indicate corresponding parts in all the figures.

Figure 1 is a longitudinal section through my coupling shown attached to a hose. Fig. 2 is an end elevation of half the hose-coupling. Fig. 3 is an end elevation of the other half of the hose-coupling, and Fig. 4 is a section taken through the ring forming part of the half of the coupling shown in Fig. 2.

The object of my invention is to provide a hose-coupling which shall be rapid in its operation, shall contain a tight joint and have no projecting members adapted to catch any object when being drawn over the same, and in which the seating-surfaces shall be completely protected from injury such as would be caused by their striking against pavements or any hard object.

My invention consists, first, in a hose-coupling comprising two complementary parts adapted to be secured to the ends of hose and provided with suitable locking means, each part having a seating-surface formed next to its inner periphery and each part having also a hood surrounding the seating-surface and projecting beyond the same to protect it from injury, whereby no matter how severe the usage of the coupling and hose may be the seating-surfaces will always remain true and perfect, so as to make and form a tight joint.

My invention also consists in providing each half of the coupling with an inner annular ring provided with an end seating-surface and with a surrounding hood fixedly secured to the inner end of its ring, the body of one or both of said rings being separated from the inclosing hood or hoods by an annular groove extending longitudinally of the coupling.

My invention also consists in providing one of the parts of the coupling with a ring screwed thereon or movable thereon, said ring and the other part of the coupling being provided with locking means, and in providing one or more packing-rings between said ring and its body member, whereby the position of said ring may be adjusted on said body member.

My invention also consists in making one of the locking members movable longitudinally of its section relatively to the seating-surface of said section and in providing the said members with interlocking ends with oblique or beveled engaging surfaces.

My invention also consists in other features of construction and combinations of parts herinafter described and claimed.

The coupling is composed of two parts, each of which is adapted to be connected with an end of a section of hose and to join the two sections of hose together when coupled. One part consists of a single casting B, which is provided with a recessed opening in one end adapted to receive an end of the hose A. The inner surfaces of these recesses are roughened or ridged, as shown in Fig. 1, and the hose is secured in place by having a metal ring C expanded within the hose, so as to force the end of the hose out against the ridges of the casing B. This is shown only as a preferred means of securing the hose to the coupling. Any other means would answer as well, as the manner of making such connection forms no part of my invention. The main body of this half of the coupling is reduced in internal diameter until it is substantially the same as the internal diameter of the ring C, as clearly shown in Fig. 1. At the end of the casing B which is next to the other half of the coupling a seat F is formed, preferably of conical shape and coacting with a similarly-coned seat formed upon the other half of the coupling. The seat F is formed upon the outer end surface of an annular flange $B^2$, which in the best form of the invention is separated from the body of the coupling by means of a groove $b'$, so that any knocks which the body of the coupling may sustain will not be transmitted to the flange upon which the seat is formed. Immediately surrounding the flange $B^2$ is an annular flange B', which in the best form of the invention is separated from the flange $B^2$ by the groove b', as shown in Fig. 1. The flange B' projects beyond the end of the flange $B^2$, so that it is practically impossible for the seating-surface upon the end face of said flange to be battered or bruised while the coupling is in use. The flange B' has a series of radially-projecting lugs $b^2$ disposed about its periphery. The number of these lugs may vary according to circumstances. I have shown four such lugs, although the number may be increased or decreased as desired. The other half of the coupling is composed of two parts, the main body D having a recess adapted to receive the end of the hose A, after the manner described for the other part of the coupling, and also having an annular flange d, which is of substantially the same diameter as the flange $B^2$ upon the other member of the coupling. This flange d has its end face cut, so as to coöperate with the coned surface upon the flange $B^2$ and to form a tight joint when the two parts of the coupling are brought together. The flange d is somewhat longer than the flange $B^2$, and the outer periphery of said flange has a threaded section adjacent to its base upon which is threaded a ring E. Between the ring E and the shoulder upon the part D, I place one or more packing rings or washers G, so that the position of the ring E upon the part D may be adjusted as desired to secure a tight joint and to compensate for wear. The ring E has an annular flange E', which projects from its outer periphery and is adapted to extend over the flange B' upon the other half of the coupling. This flange at its outer end has an inwardly-projecting flange e', which is divided up into the same number of sections as the number of lugs $b^2$ upon the other half of the coupling, forming a series of notches or openings $e^2$ of such size as to receive the lugs $b^2$. The inner side surfaces of the flanges e' are made slightly inclined to a plane perpendicular to the axis of the coupling—that is, they each form a short section of a spiral. These surfaces are also inclined, after the manner shown in Fig. 1, so as to form slight hooks which will engage the corresponding surfaces formed upon the inner side edge of the lugs $b^2$.

The flange E', it will be noticed, is outside of and projects beyond the end of the flange d, upon which the seating-surface is formed. This protects said flange and its seat from knocks and bruises and serves to maintain it in exact shape, so that a tight joint will always be maintained. In uniting the two halves of my coupling they are placed so that the lugs $b^2$ upon one half may enter the notches $e^2$ in the other half. The lugs are inserted within these notches, and the two parts are given a quick rotation upon each other. This brings the incline upon the inner side surface of the flanges e' into play to tighten the two halves of the coupling and to force the seats upon the flanges $B^2$ and d tightly together. It will be possible to give the two parts of the coupling only a small part of a revolution, the same being sufficient to tightly lock the joints together.

The two parts B and D of the coupling are provided with holes e and b, adapted to receive a spanner, by which the coupling may be disconnected. A spanner is not necessary in uniting the two parts of this coupling, as it is possible to unite them with sufficient force by the hands only, so as to make a tight joint which will not leak.

A coupling designed as herein shown has no projecting members which are liable to engage corners of stairs or any other objects, so that the hose is very readily drawn to any point desired. The seating-surfaces are also protected against injury or distortion by blows or bruises received from contact with other objects, and in this way the coupling is always in condition to make a tight joint.

The coupling is simple in construction and can be easily handled and worked.

What I claim as new, and desire to secure by Letters Patent, is—

1. A hose-coupling, comprising two parts or halves each adapted to be secured to a hose end, said halves each having an inner annular ring provided with end seating-surfaces and also having an exterior portion surrounding said ring as a hood, said hoods being each fixedly secured to the inner end of its ring, the body of each of said rings and its end seating-surfaces being separated from the inclosing hood by an annular groove extending longitudinally of the coupling, substantially as described.

2. A hose-coupling comprising two parts adapted to be secured to hose ends and having conical seating-surfaces formed next to their inner peripheries, one of said parts having a ring screwed thereon, said ring and the other part of the coupling having locking means thereon, and packing-rings between said ring and its body member, whereby the position of said ring may be adjusted on said body member, substantially as described.

3. A coupling comprising two sections having inner annular seating-surfaces and outer locking members of greater diameter than said seating-surfaces, one of the locking members being movable longitudinally of its section relatively to the seating-surface of said section the said members having interlocking ends with oblique or beveled engaging surfaces.

4. A hose-coupling, comprising two complementary parts adapted to be secured to the ends of hose and provided with locking means, each part having an inner cylindrical flange or ring formed to seat one upon the other, each also having a cylindrical flange or hood rigidly secured thereto and surrounding the inner flange or the ring and projecting beyond the same to protect it from damage, the two flanges or the ring and hood being separated by a groove or annular recess, substantially as described.

5. A hose-coupling, comprising two complementary parts adapted to be secured to the hose, each part having an inner flange adapted to seat one upon the other, one part having a flange surrounding and projecting beyond its inner flange and provided with one half of the locking means, the other part having a ring adjustably secured thereto and having a flange surrounding and projecting beyond the inner flange and provided with the other half of the locking means, said outer and inner flange of each half of the coupling being separated by a groove or annular recess, substantially as described.

6. A coupling comprising two sections having inner annular seating-surfaces and outer locking members of greater diameter than said seating-surfaces, one of the sections having a shoulder, and the locking member of said section being movable longitudinally thereof between the shoulder and the seating-surface of said section, the said members fitting into each other so as to interlock, and a packing-ring interposed between said movable locking member and the shoulder on the body of the same section, and said movable locking member being spaced outwardly from the inner portion of said section to provide a space for the reception of the locking member of the other section, the last-named or inner locking member extending from its coupling-section lengthwise beyond the end or seat thereof.

7. A hose-coupling comprising two complementary parts adapted to be secured to the ends of hose and provided with locking means, each part having a conical seating-surface formed next to its inner periphery, and each part having also a hood surrounding the seating-surface and projecting beyond the same to protect it from injury, substantially as described.

8. A hose-coupling comprising two complementary parts adapted to be secured to the ends of hose and provided with locking means, each part having an inner cylindrical flange or ring formed with a conical seat, each also having a cylindrical hood secured thereto and surrounding the inner flange or ring and projecting beyond the same to protect it from injury, the inner flange or ring of one part being separated from its outer hood by a groove or annular recess, substantially as described.

9. A hose-coupling comprising two parts adapted to be secured to hose ends and having seating-surfaces formed next to their inner peripheries, one of the said parts having a ring movable longitudinally thereon, said ring and the other part of the coupling having locking means thereon to hold the two parts of the coupling together, and one or more packing-rings between said ring and its body member, whereby the position of said ring may be adjusted on the said body member, substantially as described.

In testimony whereof I have signed my name to this specification in the presence of two subscribing witnesses.

ROBERT W. READ.

Witnesses:
EDWIN SEGER,
JOHN O. GEMPLER.